（12）United States Patent
Cho et al.

(10) Patent No.: US 6,818,857 B1
(45) Date of Patent: Nov. 16, 2004

(54) METHOD AND APPARATUS FOR WELDING

(76) Inventors: Heung Ki Cho, 1255 Belle Ave., Suite 172, Winter Springs, FL (US) 32708; Stanley J. York, 3967 Queen Anne Dr., Orlando, FL (US) 32839

( * ) Notice: Subject to any disclaimer, the term of this patent is extended or adjusted under 35 U.S.C. 154(b) by 72 days.

(21) Appl. No.: 09/995,885

(22) Filed: Nov. 28, 2001

Related U.S. Application Data

(60) Provisional application No. 60/253,479, filed on Nov. 28, 2000.

(51) Int. Cl.[7] .............................................. B23K 26/20
(52) U.S. Cl. ................................................. 219/121.64
(58) Field of Search ....................... 219/121.63, 121.64, 219/121.65, 121.66, 121.8, 121.83, 121.74, 121.77

(56) References Cited

U.S. PATENT DOCUMENTS

| | | |
|---|---|---|
| 2,534,123 A | 12/1950 | Hasselhorn |
| 3,626,582 A | 12/1971 | Melill |
| 3,918,622 A | 11/1975 | Larsen |
| 4,231,824 A | 11/1980 | Cooper |
| 4,429,211 A | 1/1984 | Carstens et al. |
| 4,644,129 A | 2/1987 | Miller |
| 4,700,045 A | 10/1987 | Merry et al. |
| 4,760,236 A | 7/1988 | Stoll |
| 4,766,285 A | 8/1988 | Decailloz et al. |
| 4,998,005 A | 3/1991 | Rathi et al. |
| 5,001,324 A | 3/1991 | Aiello et al. |
| 5,026,967 A | 6/1991 | Bell et al. |
| 5,045,668 A | 9/1991 | Neiheisel et al. |
| 5,053,601 A | 10/1991 | Landtwing et al. |
| 5,155,322 A | 10/1992 | McClellan et al. |
| 5,168,141 A | 12/1992 | Tashjian et al. |
| 5,410,123 A | 4/1995 | Rancourt |
| 5,478,983 A | 12/1995 | Rancourt |
| 5,591,360 A * | 1/1997 | Mombo-Caristan .... 219/121.64 |
| 5,607,605 A | 3/1997 | Musasa et al. |
| 5,674,415 A | 10/1997 | Leong et al. |
| 5,841,097 A * | 11/1998 | Esaka et al. ........... 219/121.63 |
| 6,040,550 A | 3/2000 | Chang |
| 6,060,682 A * | 5/2000 | Westbroek et al. ......... 219/105 |

\* cited by examiner

*Primary Examiner*—Tom Dunn
*Assistant Examiner*—Jonathan Johnson

(57) ABSTRACT

The subject method pertains to a method and apparatus for welding. The subject invention can be utilized for welding very thin sections of stainless steel. The subject technique can incorporate a laser, such as a Nd:YAG, $CO_2$, or diode laser. Furthermore, the laser may be a continuous wave (CW) or pulsed type. The subject invention can reduce or eliminate the need for expensive seam tracking or line following devices to compensate for tooling tolerances, stamping tolerances, and other effects leading to movement of the parts as they are rotated under a welding means. The subject invention can enable high quality symmetrical welds on thin sections of material, while reducing the attention required by a human operator. Furthermore, the method can be applied to other materials. Because of the nature of the beam delivery system, the spatial mode structure of the laser beam is no longer critical to the weld quality of the finished product. The method can be applied to weld the inner and outer diameters of welded bellows sections.

18 Claims, 11 Drawing Sheets

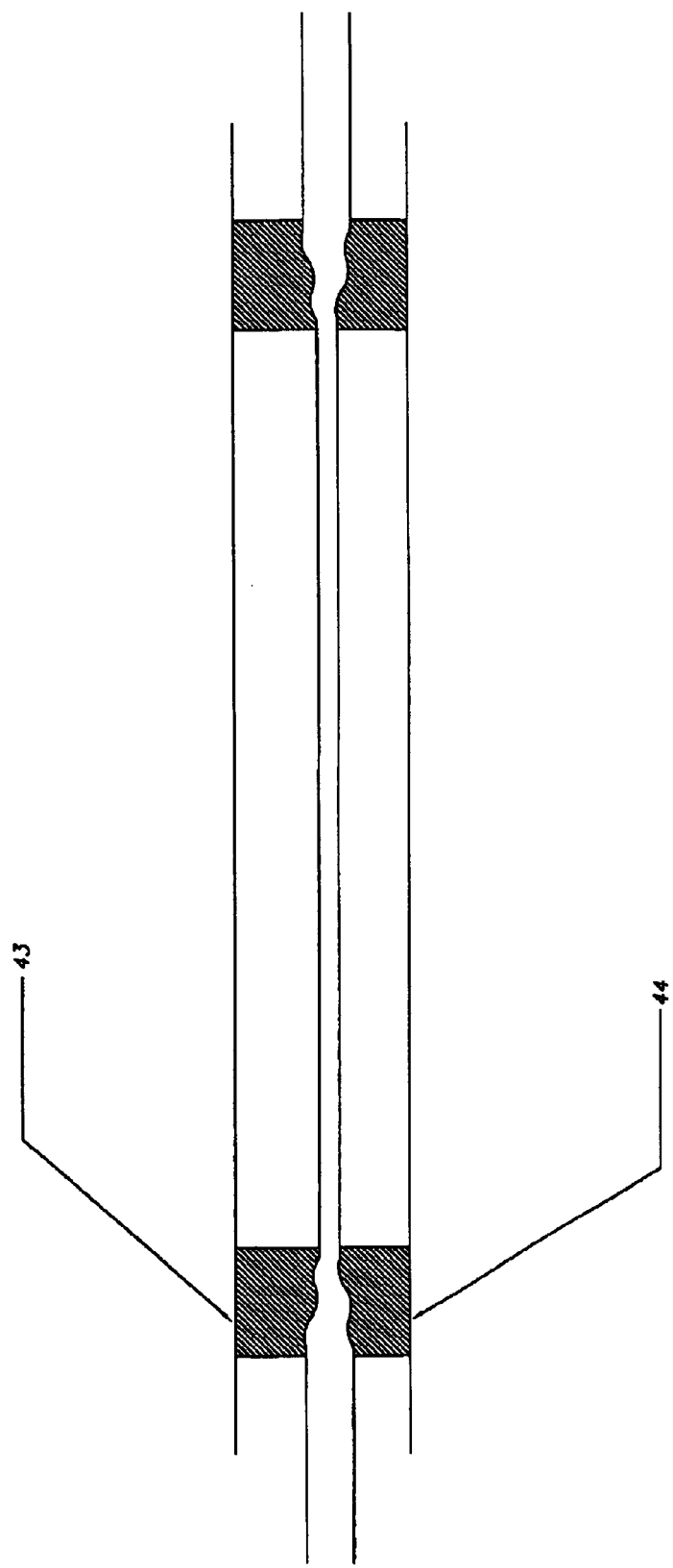

Section A-A

METHOD AND APPARATUS FOR WELDING

CROSS-REFERENCE TO RELATED APPLICATION

This application claims priority from provisional patent application U.S. Ser. No. 60/253,479, filed Nov. 28, 2000.

BACKGROUND OF THE INVENTION

For the past 2–3 decades, the production of welded metal bellows has been a very labor-intensive task. Typically, a number of stamped circular metal diaphragms about 0.004" thick are loaded in pairs into a clamping mechanism, and the clamp closed The operator then welds the inside diameter (ID) of the diaphragms using conventional welding methods such as a tungsten-inert-gas (TIG) welding torch, plasma, electron beam, NMG, gas, and/or GTAW. After a number of these welded pairs of diaphragms are made, for example via TIG, they are loaded onto an arbor between copper heat dispersing rings, and end plates clamped against the assembly to hold the metal diaphragms in tight contact with their neighboring part. The assembly is then mounted in a lathe, and rotated at a slow constant speed under a second TIG welding torch. The operator then adjusts the position of the welding torch so as to bring the welding tip in close proximity to the first seam of two of the diaphragms. An arc is struck between the torch tip and the seam, and the operator carefully follows, utilizing a microscope, any deviations in the seam path with the torch tip. By following the deviations in the seam path, the operator can maintain an arc that is fairly well centered on the diaphragm seam. After completing a weld, the TIG torch is moved to the next seam location and the procedure is repeated. This has been the standard method of producing welded metal bellows since their inception in the last 2–3 decades.

This method can be very tiring for the operator, who may be required to weld many convolutions to produce a single bellows capsule. Welding speeds using this method depends very much on operator skill level, with the top speed for an experienced welder being limited by the manual adjustments that have to be made during the weld sequence. Typical welding speeds thus vary from 10" to 12" per minute for a typical 0.008" thick diaphragm pair. Accordingly, the entire welding sequence from first weld to last weld may require a skilled operator an hour or more, and an unskilled or semi-skilled operator considerably more time. Most, if not all, of the welding is done while the operator monitors the operation through a microscope. Weld gas such as argon is directed to pour over the weld area during the weld sequence, potentially exposing the operator to the long term effects of mild oxygen starvation. The weld gas is allowed to flow continuously since the weld area should be open for operator access. Due to the small diaphragm dimensions, it is difficult to cost effectively automate this process, while maintaining the consistency, weld integrity, and reliability obtained with skilled welding operators.

There have been attempts by laser manufacturers and welded bellows manufacturers to utilize a laser in this area of processing. A number of bellows manufacturers have been involved in some experiments with laser welding. However, the reliability and repeatability of laser edge-welding methods has not been sufficient, and, therefore, production of laser welded bellows has been limited to prototype and test production quantities.

One major drawback of using a laser beam for this type of welding process is that the laser beam dimensions are typically very small. The laser beams also typically have very high power densities. In fact, power densities as high as several Mwatts/cm$^2$ are far hotter than any TIG torches presently used for this type of work, and can instantly melt most materials put in range of its focus. Consequently, welding fixtures used for laser processing should be made with extreme precision. Deviations in the weld seam can occur because of, for example, machining tolerances. These deviations can cause the weld seam to wander from side to side as the bellows assembly is rotated under the TIG torch. The manual methods of welding bellows diaphragms relies heavily on operator skills to correct for any deviation in the weld seam. It requires the skills of a seasoned operator to produce consistently good welds. Upon completion of the welding, it is common practice to inspect each weld bead. Such inspection is also a painstaking exercise that is currently undertaken manually. An operator utilizes a microscope to examine each weld bead as it leaves the weld station. If any poor or below standard welds are used in any bellows assembly, early failure during exercising will often occur. Any incomplete welds can result in vacuum leaks, and usually the scrapping of the complete bellows.

Another issue associated with laser processing is known in the industry as 'spatial mode hopping'. When a laser is operating, a profile of the energy distribution within the beam may indicate that the beam is hottest in the central area. However, adjustment of the laser resonator mirrors or a change in the pump power to the arclamp can change the spatial distribution, so that the hottest part of the beam may appear to move around within the beam cross-section. In practice, the spatial mode of a high-power laser system frequently changes as the laser power is programmed to increase, or decrease, at the start, or end, of the weld sequence. With a static beam, these variations in power density within the beam cross-section are often reflected in the molten material of the weld pool. Because of the small size of the weld pool, and the motion of the seam away from the molten area, rapid hardening of the molten material occurs upon leaving the weld pool. Thus any asymmetric melt due to variations in power density within the laser beam can be preserved in the weld, resulting in a lopsided appearance of the weld bead. This asymmetry can give rise to unwelded sections, thin or broken weld beads, and/or non-uniform stress characteristics. Often, this results in cracking during test cycling of the finished products, rendering them useless. One way to potentially overcome this problem would be to use a laser with a constant low order mode profile. That is, use a laser which can maintain a closely controlled power distribution profile across the diameter of the laser beam throughout the range of laser output power. However, a constant power distribution across the diameter of the laser beam is difficult, if not impossible, to achieve, and even more difficult to maintain.

As mentioned, deviations in the weld seam can occur, for example, due to machining tolerances. There have been many methods investigated to maintain the precise alignment required between the focused laser beam and the weld seam. Some of these methods involve magnified vision systems, tactile sensors, magnetic and capacitive proximity sensors, and digital signal processing (DSP) techniques. The method disclosed by Chang in U.S. Pat. No. 6,040,550 uses a magnified vision system and computer to locate the center of the weld seam. The laser beam position is then controlled with mirrors in an effort to follow any meandering in the weld seam path. However, this system is vulnerable to vibration, and can quickly lose accuracy of alignment. The Chang system has no compensation for thermal effects such that the system alignment can drift throughout the day with temperature, adversely affecting performance. In fact, many of the prior methods are difficult to design, expensive, and require careful setting up and maintenance. In addition, the prior methods can be prone to problems due to vibration, temperature and/or radio frequency interference (RFD) from the laser systems.

BRIEF SUMMARY OF THE INVENTION

The subject invention relates to a method and apparatus for welding. The subject invention can be used in the manufacturing of welded metal bellows. The subject method can allow higher manufacturing throughput of finished product, with consistently better quality and less operator attention than the present methods. In addition, the subject technique can reduce the volume of weld shielding gas which is consumed during the welding process, and Java reduce contamination by automation of parts handling equipment. The higher production methods, with reduced operating costs and reduction in operator skill level required, can result in cost savings during the manufacture of welded metal bellows.

The subject invention pertains to a method and apparatus for welding. In a specific embodiment, the metal bellows can be welded using heat provided by a laser beam to perform such welding. The subject invention can allow faster and more reliable production of edge-welded metal bellows using automatic methods. In a specific embodiment, the subject invention can be utilized for the welding of metal bellows diaphragms to form convolution pairs, and bellows capsules. The subject invention also relates to a machine designed for welding the outside seam of two diaphragms, an outside diameter (OD) welding system, and to a machine designed for welding the inside seams, an inside diameter (ID) welding system.

The methods and apparatus of the subject invention can deliver a laser beam so as to get a deep weld penetration and a symmetrical weld bead. In addition, the subject invention can accomplish accurate welding without the necessity for an elaborate seam tracking device. In a specific embodiment, the subject invention can incorporate weld rings which can reflect at least a portion of the laser energy which is off-axis back onto the side of the seam. Reflecting this off-axis laser energy back onto the side of the seam can produce a more efficiently melted pool, and can enable deeper weld penetration. The subject method can introduce the laser energy all around the weld seam, which can be more efficient than introducing the laser energy only on the surface in a direct line facing the laser beam. The subject invention can also incorporate a mechanism for automatic loading and unloading of bellow diaphragms into the weld clamp area reducing human errors and contamination problems due to handling.

In operation, the inside seams are preferably welded first, as is typically done with conventional welding methods. Referring to FIG. 2, a system for accomplishing this task is shown. A female diaphragm 42 can be placed in a rotating clamping fixture, and supported on the inside edge by a lower, fixed, ID clamp face. A male diaphragm 41 can then be inverted and placed on top of the female diaphragm and the upper, movable, clamp brought down under preset air pressure, the air pressure being sufficient to hold them firmly together. The clamp mechanism can then be made to rotate at a steady speed by a DC electric motor 34 under computer control. In this design, the laser beam can be split into two beams by a 50:50 beamsplitter 23 at the appropriate wavelength. The split beams can then be redirected by a prism 24 and scanning mirrors 38 and 39 through the focusing lenses 40 and 46 onto the weld seam. The two mirrors 38 and 39 can be fixed frequency scanners also referred as resonant scanners, and be used to position the beam onto a weld seam. In the static mode, i.e., with the power to the scanners off, the focused laser beams are directed to the upper and lower edges of the weld seam, as shown in FIG. 6. During the weld process, scanning mirrors 38 and 39 can be made to vibrate at a high rate of speed in order to cause the focused laser spot to move across the weld seam. In a specific embodiment, the focused laser spot can move across the weld seam at the focal plane. In a specific embodiment, the focused laser spot can scan back and forth perpendicular to the weld seam.

Referring to FIG. 3, a schematic illustration of how a laser beam can be scanned back and forth is shown. A static beam position is shown as a solid line 21, striking the front reflecting surface of the scanning mirror 38. The reflection coming off passes through focusing lens 40, preferably at near normal incidence, and focuses onto focal plane 72. As mirror 38 oscillates over a half cycle, the deflection 38a of the mirror through angle $\theta_1$ causes the reflected laser beam to be deflected through the angle $\theta_2$, where $\theta_2=2\theta_1$. The angular path through the lens repositions the focal point of the beam 71a. On the other half cycle, the beam shifts over to an approximately equal distance on the other side of static point 71. The amount of deflection on the mirror can be small, and can cause twice the angular deflection of the laser beam through optical leverage. Thus, depending on the frequency of oscillation, the laser focused spot can appear as a uniform line heat source rather than as a point heat source. Accordingly, the location of the heating can be controlled without, for example, requiring a non-shifting low-order spatial mode in the laser beam. Furthermore, the subject scanning laser beam can reduce the need for an expensive seam tracking system.

Both the inside diameter (ID) welding machine and the outside diameter (OD) welding machine laser beam optical delivery systems can work on the same principle. In the case of the OD machine, the laser beam can be preferably introduced to the weld seam at right angles to the seam, as depicted in FIG. 5, whereas in the ID machine, the laser beam can be introduced at an angle, for example, 45 degrees, to the seam as shown in FIG. 6. If desired, the laser beam can be introduced at other angles for the OD and ID machines. For example, the beam can be introduced at about a 45 degree angle for the OD machine. In the case of the beam delivery perpendicular to the weld seam, other techniques can be used to redirect the beam back onto the weldjoint, for example, where the beam is scanning past the edges of the seam, beveled weld rings can be designed to reflect the overshoot bean back onto the weld joint. In a specific embodiment, the ID and OD welding can be accomplished by a single welding machine.

BRIEF DESCRIPTION OF THE DRAWINGS

FIG. 4 illustrates upper and lower weld clamp rings which can be used with a specific embodiment of an ID welding system in accordance with the subject invention.

DETAILED DISCLOSURE OF THE INVENTION

The subject invention pertains to a method and apparatus for welding. In a specific embodiment, the metal bellows can be welded using heat provided by a laser beam to perform such welding. The subject invention can allow faster and more reliable production of edge-welded metal bellows using automatic methods. The subject invention can allow faster and more reliable production of edge-welded metal bellows using oscillating beam techniques. In a specific embodiment, the subject invention can be utilized for the welding of metal bellows diaphragms to form convolution pairs, and bellows capsules. The subject invention also relates to a machine designed for welding the outside seam of two diaphragms, an outside diameter (OD) welding system, and to a machine designed for welding the inside seams, an inside diameter (ID) welding system.

Figure 2:
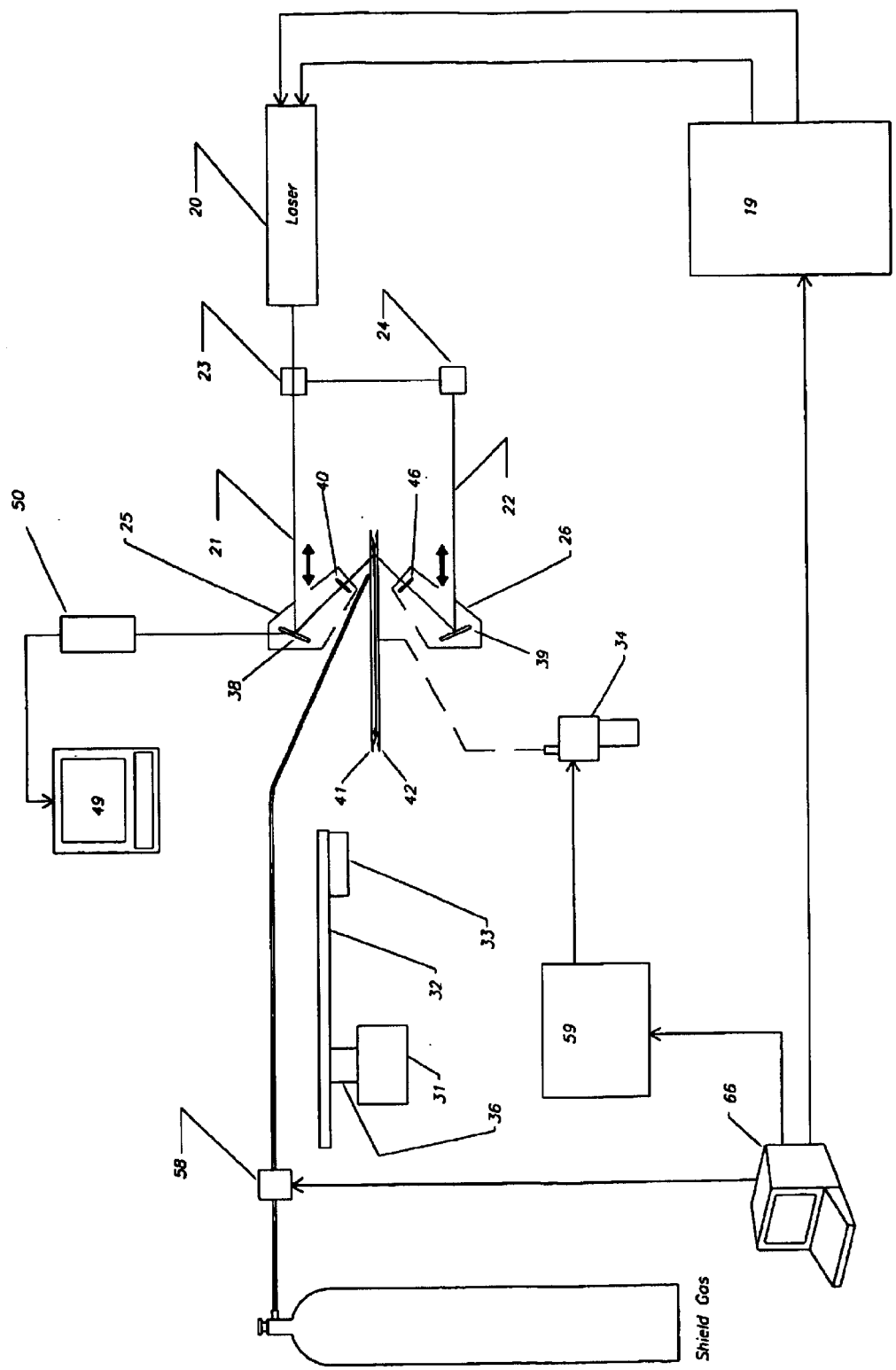
FIG. 2 illustrates a specific embodiment of an inner diameter welding system in accordance with the subject invention.
Figure 6B:
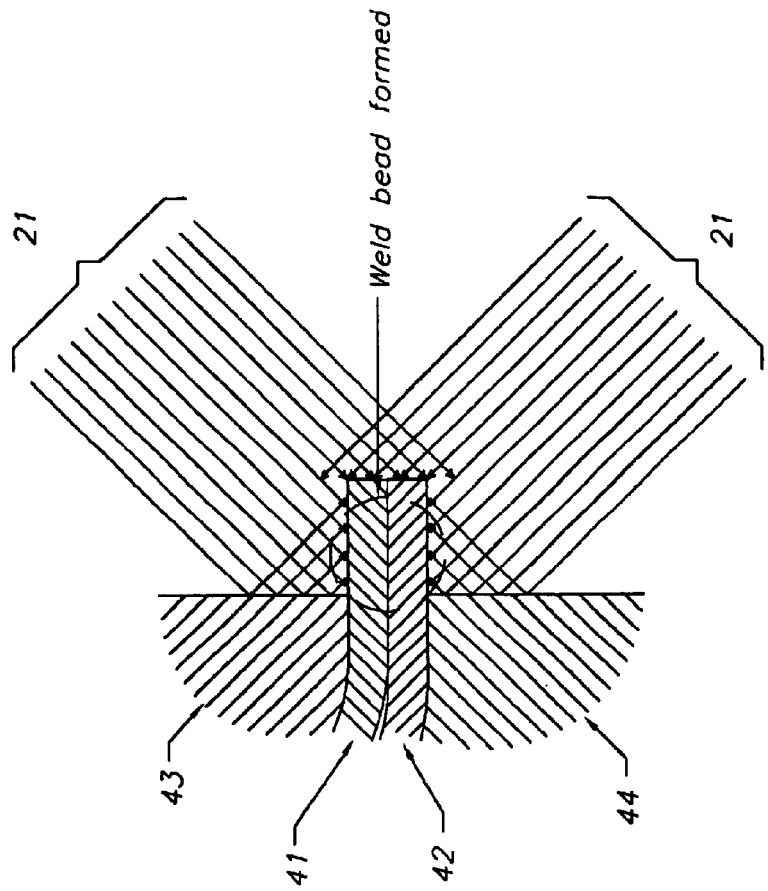
FIG. 6 illustrates how a laser beam can be presented to a weld seam in a specific embodiment of an ID welding system in accordance with the subject invention.
Figure 6A:
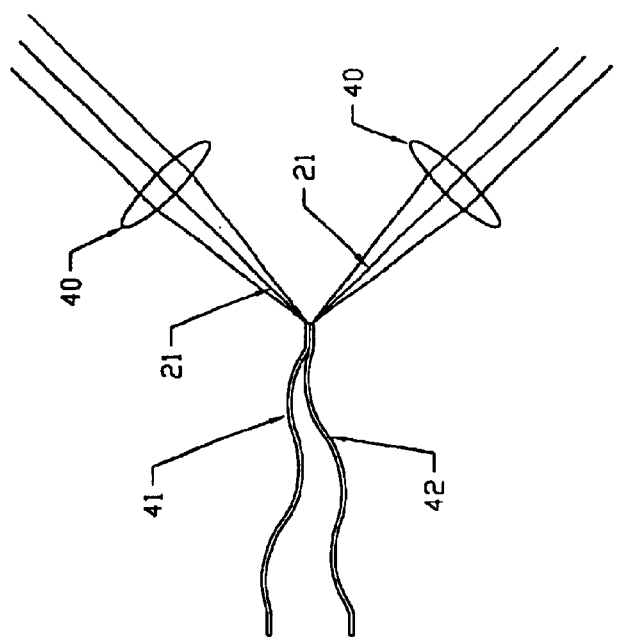

In operation, the inside seams are preferably welded first, as is typically done with the manual tungsten-inert-gas (TIG) welding method and other conventional welding methods. Referring to FIG. 2, a system for accomplishing this task is shown. A female diaphragm 42 can be placed in a rotating clamping fixture, and supported on the inside edge by a lower, fixed, ID clamp face. A male diaphragm 41 can then be inverted and placed on top of the female diaphragm and the upper, movable, clamp brought down under preset air pressure, the air pressure being sufficient to hold them fully together. The clamp mechanism can then be made to rotate at a steady speed by a DC electric motor 34 under computer control. In this design, the laser beam can be split into two beams by a 50:50 beamsplitter 23 at the appropriate wavelength. The split beams can then be redirected by a prism 24 and scanning mirrors 38 and 39 through the focusing lenses 40 and 46 onto the weld seam. The two mirrors 38 and 39 can be fixed frequency scanners also referred as resonant scanners, and be used to position the beam onto a weld seam. In the static mode, i.e., with the power to the scanners off, the focused laser beams are directed to the upper and lower edges of the weld seam, as shown in FIG. 6. During the weld process, scanning mirrors 38 and 39 can be made to vibrate at a high rate of speed in order to cause the focused laser spot to move across the weld seam at the focal plane, for example, as indicated in FIG. 6B. In a specific embodiment, the focused laser spot can scan back and forth perpendicular to the weld seam.

Figure 3:
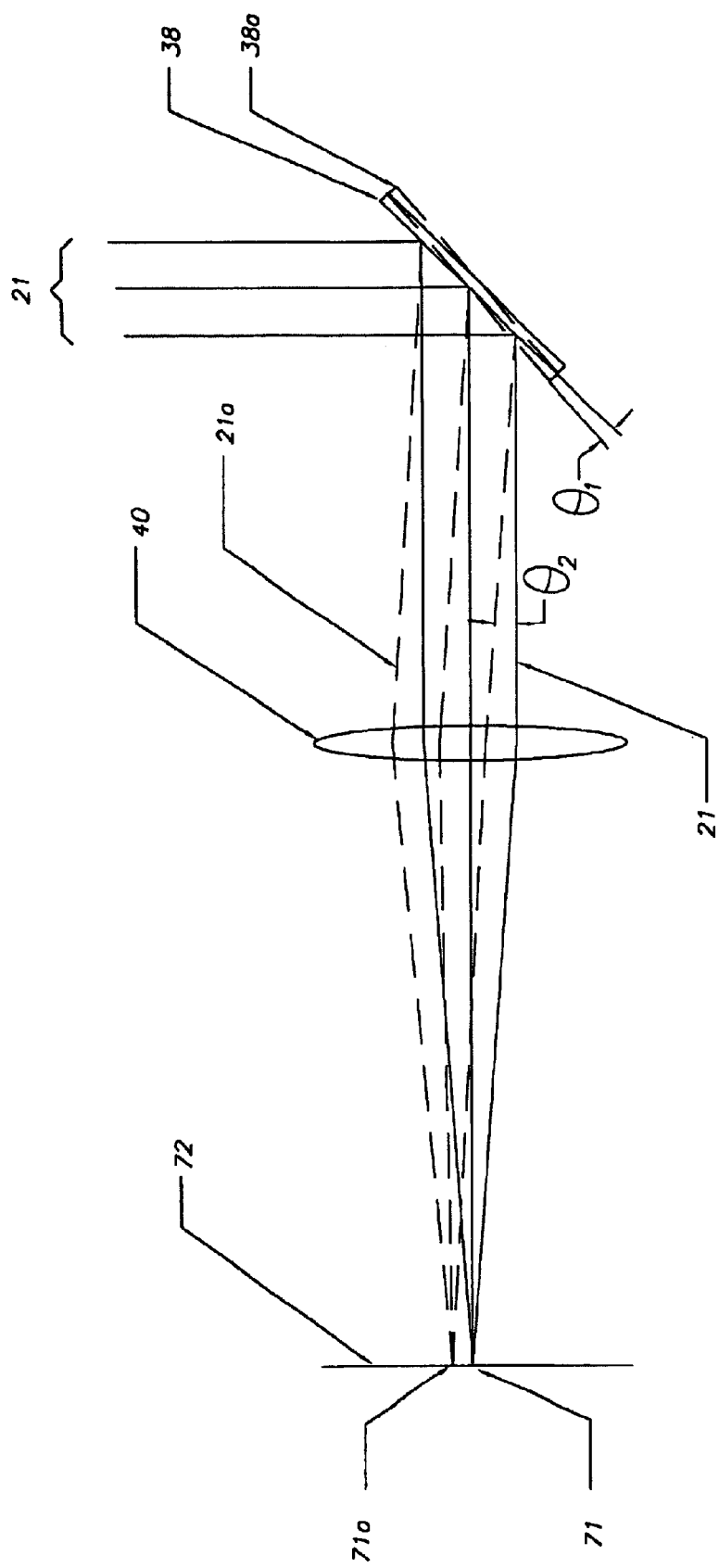
FIG. 3 illustrates the operating principle of a specific laser beam delivery mechanism in accordance with the subject invention.

Referring to FIG. 3, a schematic illustration of how a laser beam can be scanned back and forth is shown. A static beam position is shown as a solid line 21, striking the front reflecting surface of the scanning mirror 38. The reflection coming off passes through focusing lens 40, preferably at near normal incidence, and focuses onto focal plane 72. As mirror 38 oscillates over a half cycle, the deflection 38a of the mirror through angle $\theta_1$ causes the reflected laser beam to be deflected through the angle $\theta_2$, where $\theta_2=2\theta_1$. The angular path through the lens repositions the focal point of the beam 71a. On the other half cycle, the beam shifts over to an approximately equal distance on the other side of static point 71. The amount of deflection on the mirror can be small, and can cause twice the angular deflection of the laser beam through optical leverage. Thus, depending on the frequency of oscillation, the laser focused spot can appear as a uniform line heat source rather than as a point heat source. Accordingly, the location of the heating can be controlled without, for example, requiring a non-shifting low-order spatial mode in the laser beam. Furthermore, the subject scanning laser beam can reduce the need for an expensive seam tracking system, and preferably eliminate the need for an expensive seam tracking system.

Figure 5B:
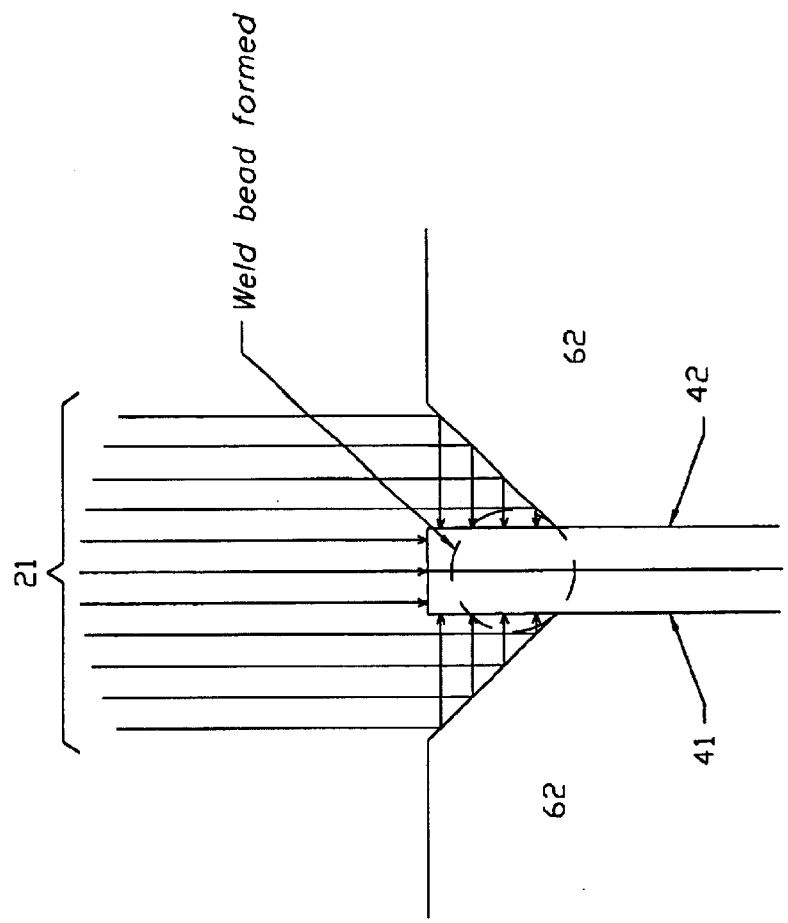
FIG. 5 illustrates how a laser beam can be presented to a weld seam in a specific embodiment of an OD welding system in accordance with the subject invention.
Figure 5A:
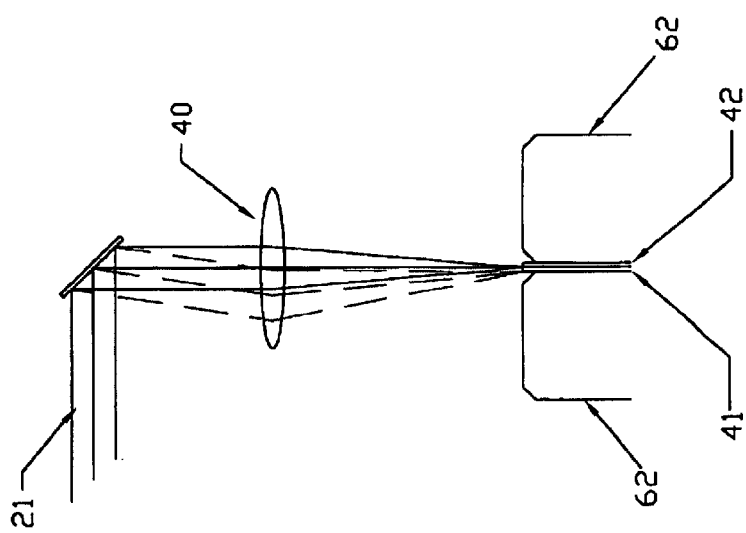

Both the inside diameter (ID)welding machine and the outside diameter (OD) welding machine laser beam optical delivery systems can work on the same principle. In the case of the OD machine, the laser beam can be preferably introduced to the weld seam at right angles to the seam, as depicted in FIG. 5, whereas in the ID machine, the laser beam can be introduced at an angle, for example, 45 degrees, to the seam as shown in FIG. 6. In a specific embodiment, the ID and OD welding can be accomplished by a single welding machine.

Figure 1:
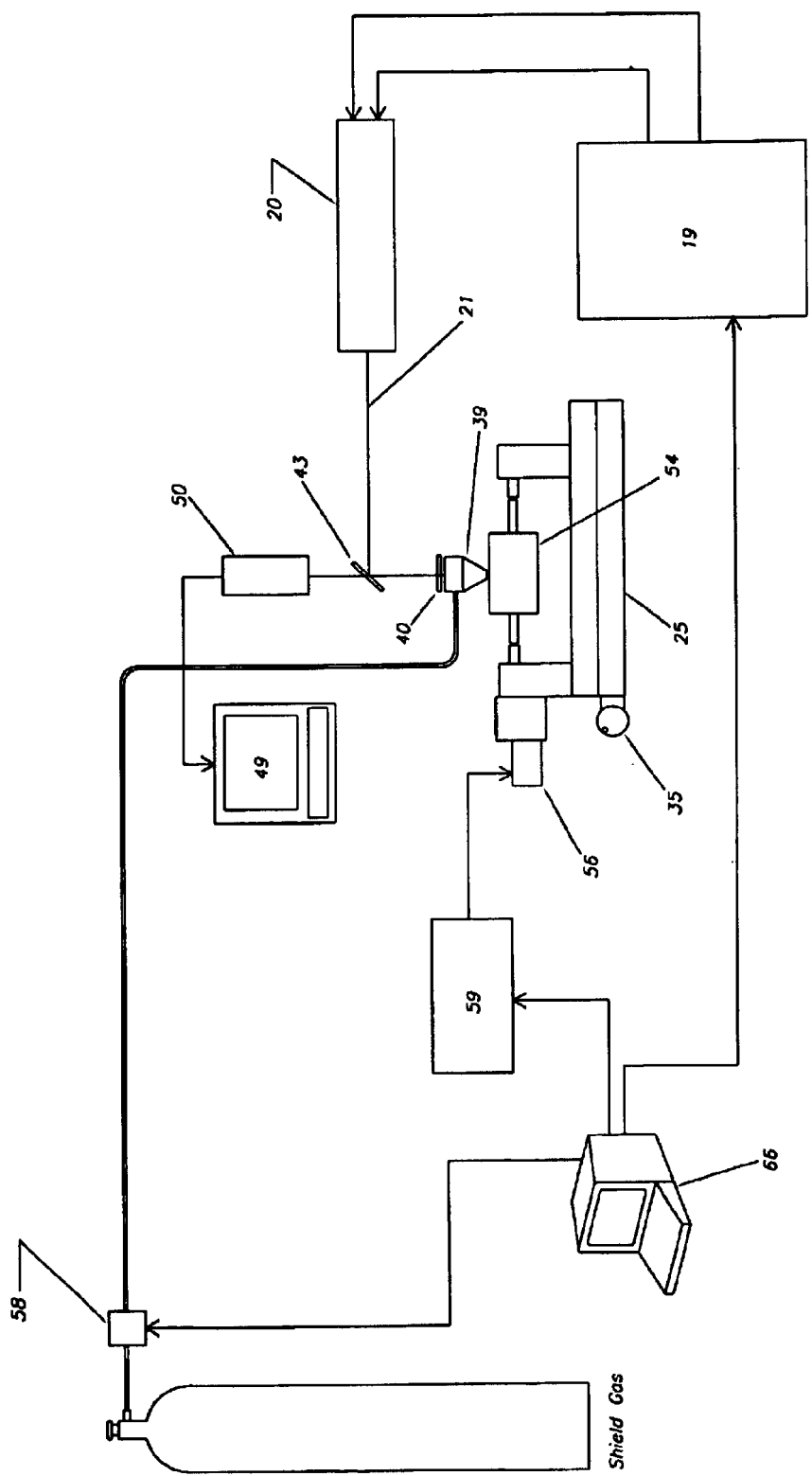
FIG. 1 illustrates a specific embodiment of an outer diameter welding system in accordance with the subject invention.
Figure 9B:
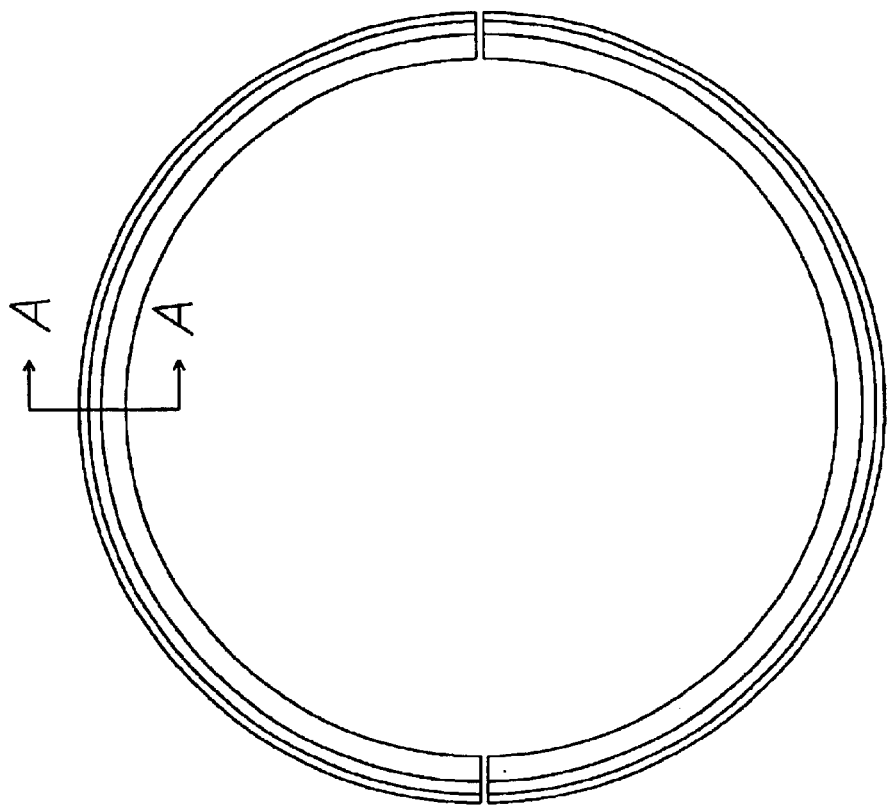
FIG. 9B illustrates a specific weld ring design.
Figure 9A:
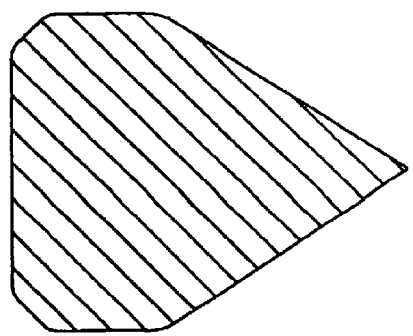
FIG. 9A is a cross sectional of FIG. 9B taken along lines A—A.

Referring to FIG. 1, a specific embodiment of an outside diameter (OD) welding machine is shown. Laser beam 21 first strikes resonant scanner mirror 38 at some angle. In this embodiment, the laser is set up in the static mode, i.e., not oscillating, so that the emerging beam falls onto the center of 45° mirror 43. The reflected beam then goes through the center of focusing lens 40 at normal incidence, and passes through an aperture in nozzle assembly 44 and comes to a focus at the weld seam. Diaphragms 54 are held between reusable clamp half rings, as shown in FIG. 9, for support during the welding process. When energized, the scanner mirror can cause the focused laser beam to traverse the weld joint. In particular, the scanner mirror can cause the beam to scan back and forth across the weldjoint.

Referring to FIG. 2, a specific embodiment of an inside diameter (ID) is shown.

The laser beam from laser 20 is split into two separate beams by a 50:50 beamsplitter 23. The two beams 21 and 22 then follow similar paths toward the weld seam. Laser beam 21 is deflected at 90° by the fully reflecting beam bending prism 24 and then follows a parallel path with the upper beam 21. The resonant scanner mirrors 38 and 39 are set up in the static mode, so that the reflected beams enter the center of focusing lenses 40 and 46 at normal incidence. The emerging beams are then positioned approximately on the upper and lower edges of the weld joint. The combined power of the two beams is thus the addition of the individual powers. An air driven mechanical clamping method (not shown) can hold diaphragms 41 and 42 together during the weld process. The laser beams can then scan the edges of the seam, fusing the edges together.

Referring to FIG. 3, the operating principle of the subject scanning method is illustrated. Laser beam 21 impinges on the reflecting surface of scanner mirror 38 at an angle that is initially set up in the static mode, i.e., not moving. The mirror angle can be adjusted so that the emerging beam passes through the center of the focusing lens 40 at normal incidence and describes a point 71 at target plane 72. The static laser beam path is shown as a solid line in FIG. 3.

When scanner mirror 38 is operating, a deflection of a half cycle 38a will cause the mirror to move through angle $\theta_1$, thus causing the reflected laser beam 21a to pass through the focusing lens at angle $\theta_2$, away from the center. The result is that the emerging beam is displaced off center, and will thus focus at some point away from the static point 71. Similarly, when the scanner is deflected in the other half cycle, the laser beam is deflected an equal distance to the other side of the static point 71. Thus, near static point 71, the laser beam delivers energy in a narrow line rather than at a single spot. Likewise, near a weld seam, the subject laser beam can deliver energy in a narrow line rather than at a single spot. The line width of this narrow line is the diameter of the focused laser beam, while the length of the line can be varied by altering the scanning angle of resonant scanner mirrors 38 and 39.

Referring to FIG. 4, the basic form of upper and lower weld clamp rings which can be used with the subject ID welding system is shown. In the embodiment shown in FIG. 4, each of the clamp rings has a profile cut to match the bellows diaphragms being welded. The advantage of such a profile, even though it is time consuming and quite expensive to make, is that the bellows diaphragms can then be automatically centered in the welding fixture. This greatly reduces the chances of the diaphragms being welded off-center. This configuration also allows the use of a pick and place mechanism with the subject invention, and can reduce the level of precision required with respect to such pick and place mechanism. Although tolerances of within +/−0.0005" are needed with current alignment techniques, the subject clamps can allow tolerances on machined parts to be increased by, for example, a factor of ten and still be practical.

Referring to FIG. 5, a schematic diagram of how the laser beam is presented to the weld seam in a specific embodiment of an OD welding system is shown. The differences in angle of incidence on the focusing lens can cause the focused laser spot to describe a line across the weld seam, e.g., perpendicular to the weld seam. Preferably, the laser is scanned back and forth at a high enough speed such that it appears that the laser beam is a continuous beam which is much wider than the actual laser beam. The width of the laser scan can be adjusted by adjusting the maximum angle of the scanner mirror and/or the distance from the scanner mirror to the weld seam. In a specific embodiment, the apparent beam width can be 2–3 times the width of the weld seam, enabling most deviations from a straight seam to be successfully welded, even without the use of an expensive and elaborate seam tracking system. The frequency at which the laser beam is scanned back and forth can be adjusted by adjusting the frequency of the scanner mirror. In a specific embodiment, the focused laser beam can cross the weld seam about 5,000 times per second, such that overlapping scans are close enough together so as to be undetectable in the finished weld.

Referring to FIG. 6, a schematic diagram of how the laser beam is presented to the weld seam during an inside diameter (ID) weld with respect to a specific embodiment is shown. The beam positions can be adjusted while the system is in the static mode, i.e., not scanning, so that the focused laser beam falls on each of the corners of the respective diaphragm sections. Accordingly, during operation the scanning mirrors displace the laser beam such that the focused beams overlap at the weld seam interface, causing complete fusion between the two diaphragms.

Figure 7B:
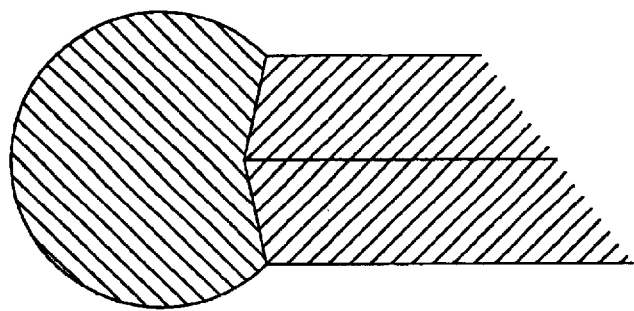
FIGS. 7A and 7B show a comparison in weld penetration between conventional welding methods in FIG. 7A and laser welds in 7B.
Figure 7A:
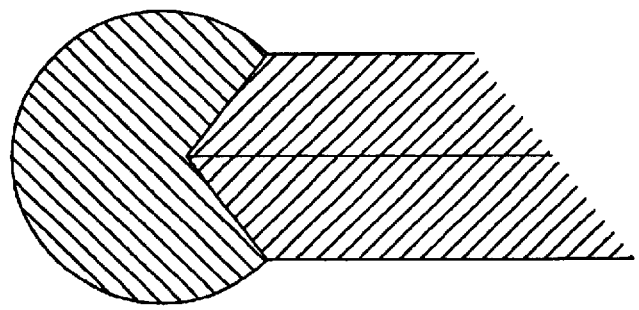
Figure 8:
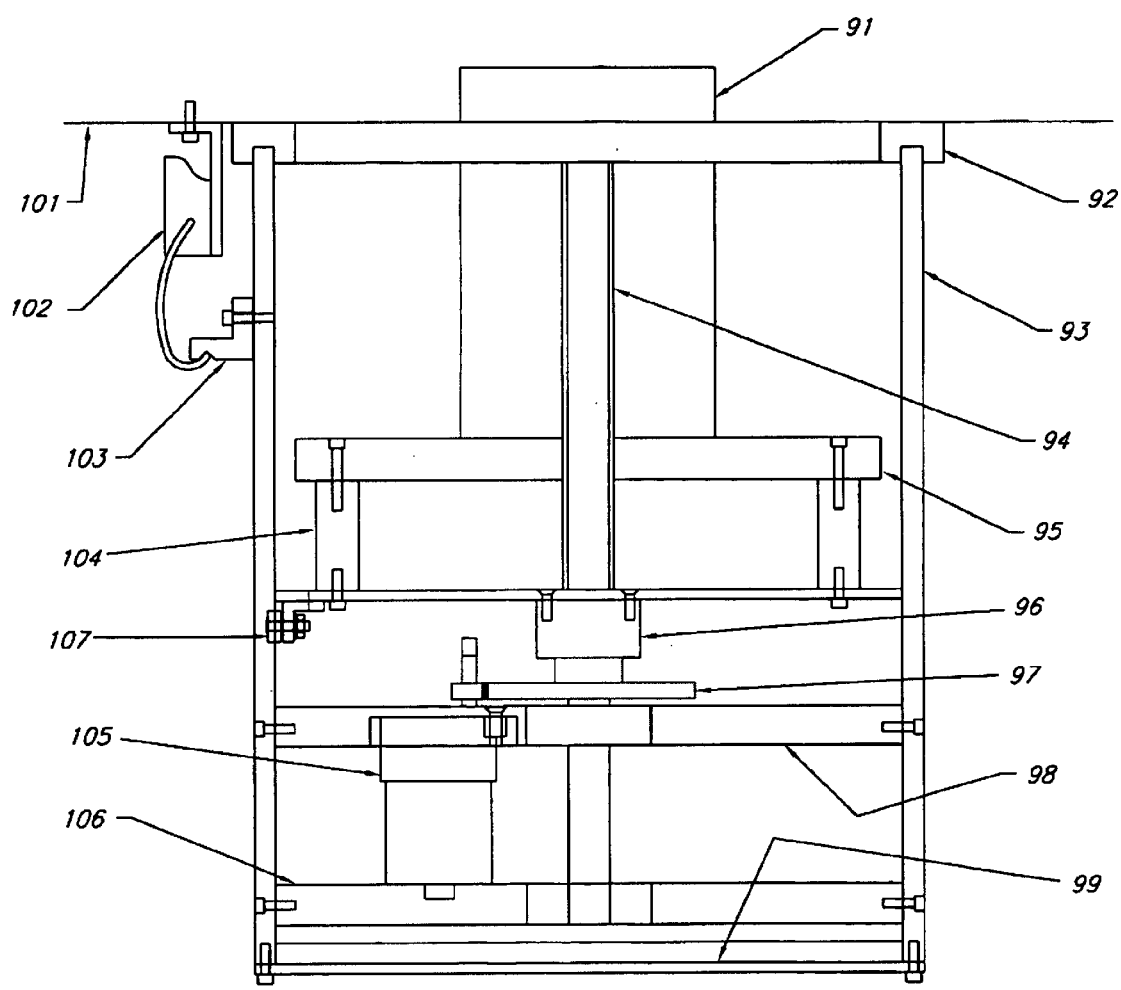
FIG. 8 illustrates the sealed container of bellow diaphragms attached to the bottom of the ID welding station of the present invention.

Referring to FIGS. 7A and 7B, a cross section of a typical welded metal bellows diaphragm pair for a TIG weld and a laser weld, respectively. Microscopic analysis indicates that the laser weld is deeper and therefore stronger than a TIG weld. The laser provides greater weld penetration for equal sized weld beads. It has been found that most weld failures occur in the heat affected zone (HAZ). The heat affected zone resulting from laser welding can be much smaller than the heat affected zone resulting from TIG welding, since the total heat input (time×temperature) can be far less than with TIG. Resulting stress analyses indicate a higher reliability can be expected from a laser welded part.

The inside diameter (E)) of the diaphragms can be welded on the subject ID welding system. A specific embodiment of an ID machine can utilize any type of CW laser with enough output power to melt the bellows material, an airtight enclosure containing the laser beam steering and delivery optics, an air driven mechanical clamping system, a stepper motor driven platform driving an air operated vacuum pick and place mechanism, and a method of delivering male and female diaphragms to the pick and place mechanism, and a vacuum operated welded convolution removal mechanism. The laser and other components can be mounted to a table. A CCTV viewing system can be used for aligning the laser with the diaphragms and for viewing the weld process. A desktop computer can control the system. One embodiment of such a system can accommodate up to 6½" diaphragms, and even larger diaphragms can be accommodated with a simple change of a weld clamp.

In a specific embodiment of the subject invention, the laser system is a solid state continuous wave (CW) Nd:YAG system. The maximum power output from this laser is about 200 Watts continuous. In addition, this laser has certain built-in features that make it desirable for this application. For example, it is easily interfaced with a computer for control of laser output power, shutter control, and safety interlock features. For initial setting up, the laser system can be put into a manual operating mode. Other lasers having sufficient power to cause the material to be welded to melt could be used as well. Examples of other lasers which can be used include, but are not limited to, Nd:YAG, Nd:Glass, Nd:YVO, CO, $CO_2$, Cr:Ruby, diode lasers, diode pumped lasers, and any of their derivatives. This range includes all lasers of CW and pulsed operation.

As discussed, the subject system can utilize an airtight enclosure. This enclosure can completely cover the weld area and laser optics, preventing dust settling on laser beam steering mirrors and causing damage. A gas purge can be performed prior to operation in order to lower the oxygen content within the enclosure, and preferably to ensure that the atmosphere within the enclosure is free of oxygen. A positive pressure can be applied during operation to keep out all dust and oxygen. Accordingly, the welded parts can come out cleaner and more oxide free. The enclosure can also act to prevent accidental movement or unauthorized adjustments of any laser optical component, enhancing repeatability. The enclosure further provides protection for the operator by blocking unnecessary exposure to the laser beam, while still providing adequate viewing of the manufacturing process. The argon gas can be the recirculated and reused, thereby reducing the total amount of gas required. Gas consumption with this method is about 5%–10% of the volume used in previous methods. Furthermore, the enclosure can reduce operator exposure to the argon gas. The enclosure can help prevent contamination of the diaphragms prior to the welding process. The diaphragms can be cleaned very thoroughly prior to being welded, and put within the enclosure to minimize fingerprints, skin particles, water, oil and other contaminants which may cause inferior welds.

In a specific embodiment the laser beam steering and delivery optics can utilize a plurality of flat mirrors, plano-convex focusing lenses, a 50:50 beamsplitter, a 90 degree prism, and a beam entrance window mounted to the enclosure. Of these components, preferably only one surface of the beam entrance window is exposed to the open air of the environment. All other components can then be totally enclosed within the welding enclosure. In this manner, the laser optics can be kept very clean and free from contamination. Preferably, the entrance window does not significantly modify the laser beam or path, and can be easily kept clean.

An air driven clamp can be used for applying pressure between the male and female diaphragms during the ID welding process. Air driven clamps offer several desirable features A 2" stroke air cylinder mounted to each end of the upper clamp platform can apply downward pressure to hold the diaphragms together while they are being welded. Controls for air flow and pressure make the system versatile over a wide range of bellows sizes which can be produced by the subject system.

A stepper motor driven rotating stage can hold another air cylinder used for picking up and placing the unwelded diaphragms into the lower weld clamp under computer control. A three position arm can carry a vacuum cup designed specifically for the diaphragms being welded. These cups can again be under computer control through vacuum solenoid valves. Pick up and release of the diaphragms can be achieved by opening and closing the solenoid valves connected to a vacuum reservoir. The welded diaphragms (convolutions) are then picked out of the weld clamp area by the third vacuum cup and deposited into a carrier for further processing.

The cleaned, unwelded diaphragms can be contained in airtight canisters that can be detached for refilling, and mounted under the pick and place mechanism ports. These canisters can contain a built in delivery mechanism for the diaphragms, and automatically adjust the height of the diaphragm stack to maintain a constant level position for the vacuum pick and place mechanism cups.

A CCTV system can be used for viewing the diaphragms in the clamp while adjusting the laser optics. Approximately 40× to 100× magnification can be provided by the viewing optics, to allow accurate positioning of the laser beam with respect to the diaphragm edges. This also allows a view of the weld area during the weld process, and can be positioned to view from above or below the worktable. It can be used for setting up purposes, and left for monitoring the weld operation if desired. In a specific embodiment, the optical system has been designed so that the CCTV system looks through the final focusing lens onto the weld seam. Thus a magnified image of the weld area is displayed on the TV monitor, allowing easy setup and adjustment of the laser focus and weld seam positions.

In a specific embodiment, the computer system used to control the operation of the ID system is a desktop type PC with special interface boards. A digital-to-analog (D/A) board controls the laser power and DC motor speed, and a digital input-output (I/O) board controls all switching functions in and out of the computer. Laser interlocks can also be monitored through the digital I/O port. Data tables can store information under, for example, a part number sequence, for each type and size of bellows to be manufactured. Weld speed, material type, laser power, laser power ramp, weld overlap, material thickness, convolution diameter and weld clamp information can be stored under a part number chosen to represent the bellows type being made.

In operation, the computer preferably controls all aspects of the welding process, unless the machine is in setup or manual mode. Upon loading the diaphragms into the weld clamp fixture, the upper clamp lowers into position, holding the diaphragms in tight contact. The computer then issues a command to the DC motor to begin rotating at a predetermined speed. This speed can, for example, depend on diaphragm size, material, and material thickness. A short gas purge can be used to clear the welding area of any stray oxygen. The laser shutter can then open. The laser power can then be increased, or ramped up, to the level required for welding, and the power level held constant until 1 complete revolution of the diaphragms is made. A short distance can be allowed for the overlap of the weld ends to ensure complete closure of the seam. The laser power can be then ramped down to a standby level, the laser shutter closed, and the weld gas turned off. The DC motor stops rotating, the upper clamp retracts, and the pick and place mechanism retrieve s the now welded convolution from the weld area, and replaces the pieces with new diaphragms. The whole operation may take from a few seconds (for a small convolution) to 30 seconds (for a larger convolution). Welding speed is typically 40 to 120 inches per minute, depending on material and thickness. These speeds represent a major improvement over the manual TIG welding method, whose top speed may be about 12 inches per minute (for a skilled operator).

The outside diameter (OD) of the convolutions can be welded on an OD welding system. A specific embodiment of an OD machine can utilize a 200 Watt (max output) CW Nd:YAG laser, an optical rail carrying a resonant scanner, laser beam deflecting optics, a gas delivery nozzle and shield plate, and a CCTV viewing system. The laser and other components can be mounted to a table. A linear motion table can be mounted to the tabletop, and carry a lathe to which an arbor can be mounted. The arbor in turn carries the convolutions and copper half rings (not shown) for the weld sequence. There is no maximum size OD convolution that can be welded with this system.

In a specific embodiment, a solid state continuous wave (CW) laser system can be used having a Nd:YAG crystal with a high current Krypton arclamp used as the pump source. The maximum power output from this laser is about 200 Watts continuous. It has certain built-in features that make it desirable for this application. For example, this laser system can be easily interfaced with a computer for control of laser output power, shutter control, and safety interlock features. For initial setting up, the laser system can be put into a manual operating mode.

In a specific embodiment, the OD weld laser beam is deflected at the end of the optical rail by a mirror mounted onto a resonant scanner 38. The reflected beam then strikes a dielectric-coated mirror 43, is reflected at 90 degrees vertically, and enters the center of the focusing lens 40. The optical system in this embodiment has been designed so that the CCTV system can look through the dielectric coated mirror and final focusing lens onto the weld seam. Thus a magnified image of the weld area can be displayed on the TV monitor, allowing easy setup and adjustment of the laser focus and weld seam positions.

A shield gas nozzle can be incorporated into this system. Such a shield gas nozzle can trap a layer of argon shielding gas between the gas exit port and the weld area until such time as the weld seam has cooled below oxidation temperature. In a specific embodiment, gas flows of 5%–10% of previous flow rates used with the TIG systems have bee achieved due to the nozzle design. The focusing lens and nozzle can be integrated into an easily adjustable package so that when the correct focus position is found, as can be determined by viewing the CCTV monitor, the gas nozzle standoff from the weld area is correct.

The linear motion table can support a lathe capable of holding a bellows capsule assembly of the largest diameter and length which will be welded in the system. In a specific embodiment, the linear motion table has an overall travel distance of 16" and a load capacity in excess of 20 lbs. The table can be controlled by means of an indexing drive and computer program to advance the table by one convolution pitch per weld sequence. The software used to control the motion of the table can be given weld and motion parameters from stored information entered under, for example, a part number given to the particular bellows type being made.

In a specific embodiment, the computer system used to control the operation of the ID system is a desktop type PC with special interface boards, and a proprietary software package. An interface board controls the laser power and DC motor speed, and another interface board controls all switching functions in and out of the computer. Laser interlocks can also be monitored through the digital I/O port. Data tables can store information under, for example, a part number sequence, for each type and size of bellows to be manufactured. Weld speed, material type, laser power, laser power ramp, weld overlap, material thickness, convolution diameter and weld clamp and half ring information can be stored under a part number chosen to represent the bellows type being made.

The half rings, for example, copper half rings, now shown can be made specifically for the type of bellows being welded. They can be custom designed to assist in heat removal from the weld edge, and also to support the edges against buckling during the weld process.

In contrast with prior art techniques which used disposable rings, the subject invention can incorporate reusable rings. These rings are designed to be easily removed from the welded bellows.

During operation of an ID welding apparatus in accordance with the subject invention, bellows diaphragms can be placed in the weld clamp by a pick-and-place arm operated, for example, by stepper motors, air cylinders and vacuum cups. This method of delivery can provide a uniform feed rate without interruption, as well as other advantages, for example, this delivery method can reduce or eliminate a human operator's intervention, thereby reducing or preventing contamination from skin abrasion, and oils and greases found on skin. It also eliminates particulate matter that may be picked up on protective gloves worn by an operator. This method can eliminate possible errors in diaphragm placement, and reduce skill requirements associated with a human operator. The automatic transfer of diaphragms allows one operator to control multiple machines, for example, with occasional attendance. It can reduce manufacturing costs by eliminating the need for multiple skilled operators.

In a specific embodiment, bellows diaphragms are loaded into sealed airtight containers (to be described below) after cleaning, and backfilled with shield gas. The top sealing cover can be removed, and the containers mounted under a pick-and-place arm prior to welding. This packaging method can offer one or more of the following advantages. If bellows diaphragms are not required immediately, they may be stored in the containers until used. Because of the backfilling of shield gas, surface oxidation will not take place, resulting in cleaner, more secure welds. Product throughput can be increased by eliminating any damaged or dropped diaphragms. The normal method of handling diaphragms before welding is by sorting them into pairs onto stainless steel wires. This frequently results in diaphragms being dropped onto the floor, deforming the edges and contaminating them with dust etc.

In a specific embodiment, the laser beam is split into two beams, for example, having approximately equal powers, before being delivered to the weld seam. Alternatively, two separate beams can be used.

According to Chang's patent 6,078,021 paragraph 2 lines 29–43, referencing both laser and electron beam welding methods, if the beams are delivered at ". . . an oblique angle may cause a nonsymetrical and low quality weld . . . ". Further down, U.S. Pat. Nos. 5,478,983 and 5,410,123, both to Rancourt, suggest a laser to weld the inner and outer seams using an "oblong" shaped laser spot. The subject system can overcome the oblique angle drawback described by Chang by dividing the beam into two, preferably equal power, beams, and delivering the beams obliquely to opposite sides of the weld seam. Such delivery can produce a uniformly distributed heat field resulting in an essentially symmetrical weld (see FIG. 6). The subject system can also circumvent the need for an oblong laser spot through oscillating (or shaking) the beam as illustrated in, for example, FIGS. 3 and 5. This beam delivery method can also provide other advantages. The final focusing lens (40) can be situated far from the weld point in order to minimize the likelihood of weld spatter reaching the lens, improving the lens life. There can also be greater clearance for operator maintenance and general housekeeping around the weld clamp and optical system. Because of the greater distance from the lens to the weld site, there is ample clearance for changing weld clamp halves (43,44) for a different size bellows, without disturbing or removing any beam delivery mechanism.

The weld bead dimensions and symmetry can be controlled through independent positioning of the two laser beam focused spots. With the beam split and recombined on the weld seam at 45°, a portion, if not all of the laser energy that overshoots the edges of the seam can be reflected back onto the side of the seam by the polished weld clamp wall. Therefore more of the available laser energy is used in melting the diaphragm material, allowing the welding to be done at a lower power setting, or at a higher welding speed, or both.

As the subject apparatus heats up during use, there is less tendency for the laser beam to wander from the weld seam. Preferably, there are no optical components close to the weld site that could move or be damaged by influence of the welding process. Being open, there is nothing to impede weld gas coverage around the weld point, resulting in more consistent, cleaner welds. Vapor pressure above the weld pool forms a small depression in the molten surface of the pool. With the beam shaking in the manner described, there is a tendency for the weld surface to "shake out" or "even out" any variations in melt volume due to burrs in the edges of the stamped diaphragms. When the beam is split, there are reduced restrictions on inside diameter welds. The subject system is capable of welding as small as 1/8" or even less in inside diameter, with no restriction for larger diameters.

A CCTV camera setup (50) can be used to accurately focus the laser beam onto the weld seam. This can normally be used when setting up the system, but may also be used to monitor the weld process. This camera looks through the laser optics, and gives an accurate representation of the weld process in real time. The weld gas delivery nozzle can be independently adjustable in X-Y-Z position via a 3-axis translation stage for precise control of gas coverage over the weld point, as accurate positioning is necessary for the strongest, cleanest-looking welds.

Figure 10:
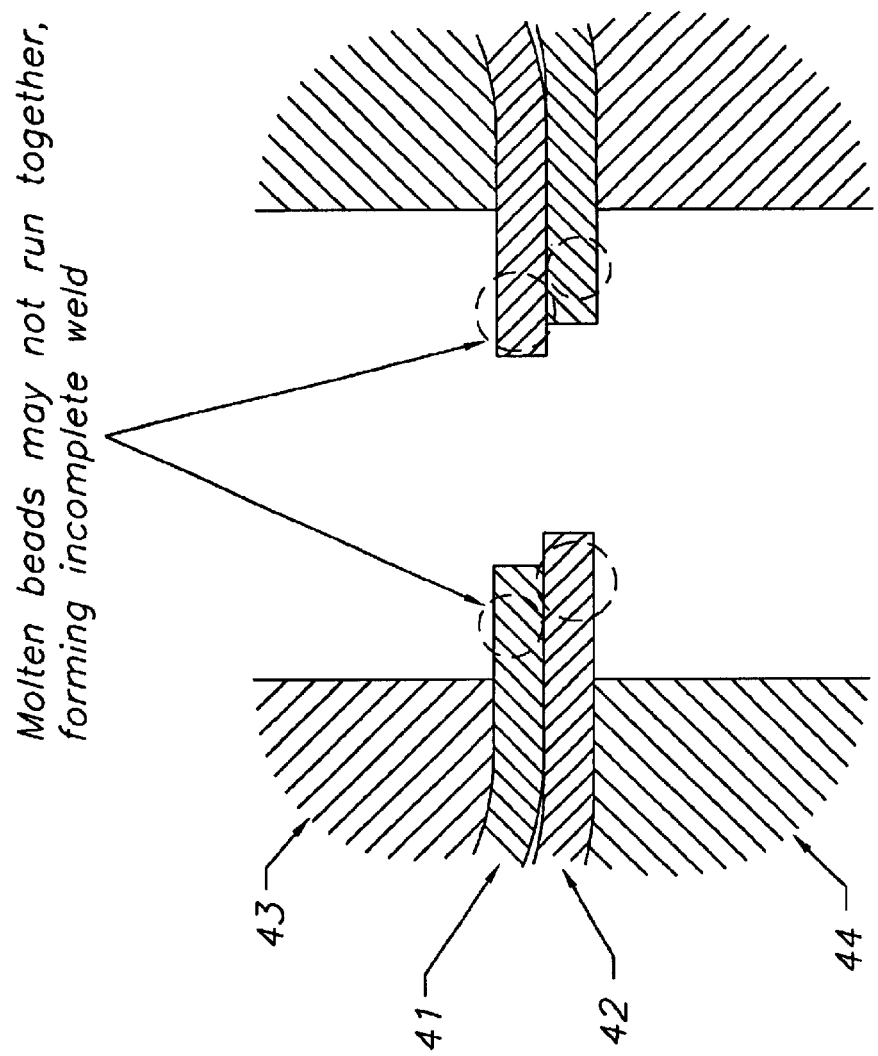
FIG. 10 illustrates one of the problems with the prior art conventional welding methods.
Figure 11:
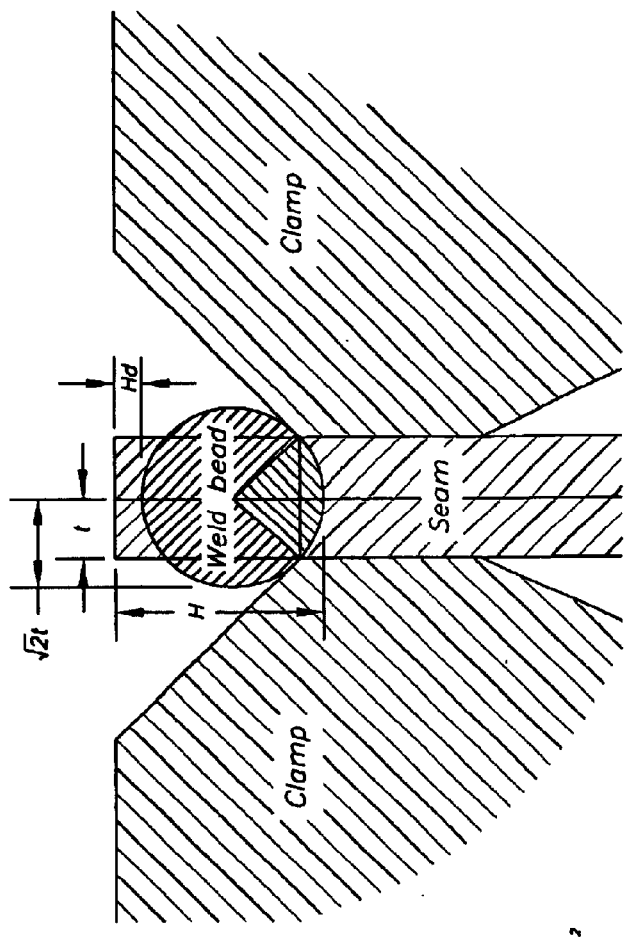
FIG. 11 illustrates the 45° beveled edge of the OD ring.

To completely cover the weld seam in the event of drift, or run-out due to mechanical tolerances, the laser beam can be shaken in a vertical plane rather than delivered in a steady (static) manner. The required degree of shaling is small, and can be adjustable to cover, for example, at least 3–4 times the weld seam width. This oscillating, or shaking, beam delivery method offers several advantages. Because the beam is oscillating rapidly over the weld joint, it appears as a continuous beam that is much wider than it actually is. Therefore, even if the weld seam were to deviate vertically or horizontally from the mean position, the laser beam would likely still be able to cover the seam, resulting in a continuous weld. FIGS. 5, 5a, 6, and 6a illustrate the principles employed here, as it applies to both the ID welding system and the OD welding system. If bellows diaphragms are not placed exactly together and display some radial runout, a static beam would result in a very poor weld appearance, perhaps not welded all round. The uniform heat field presented by the subject oscillating laser beam melts everything down uniformly, effectively eliminating the asymmetric welding that this scenario would normally present (See FIG. 10). In any high power laser beam, there is a tendency for the power density to vary over the cross-section of the beam. The amount of variation even varies as the power level is changed, as for instance during a weld sequence. This follows even down to the focused spot. During a weld sequence, the beam focused spot size is about the size of the material being welded. Any deviation of the weld seam or change in power density in the typical 'steady' focused spot will cause more rapid melting where the power density is highest (perhaps to one side of the seam). The resulting weld would appear lumpy, irregular, asymmetric, and in some cases even un-welded. Because the subject beam shakes in the manner described, there is a homogenizing effect on the beam, resulting in a fairly uniform power density across the beam section, even during power ramping (laser power rising and falling at the start and end of a weld sequence). The wider beam coverage afforded by the subject laser beam shaking in the above manner allows much wider machining tolerances on ID clamps, making the clamps easier and faster to produce. Operator skills become less critical, and throughput is higher because of fewer rejected parts.

Initial setup for new bellows sizes and new clamps is also easy. The beam shaking mirrors, and laser beam delivery optics can be mounted on a common translation stage (25, 26), so that the related optical components stay fixed in relation to each other. Translating this stage in and out allows larger or smaller diameter welds to be performed with minimal effort. A red sighting laser can be used to position the beam onto the weld joint. The tolerance on laser beam positioning is on the order of +/−0.01" from the ideal position. With some prior systems, the beam has to be placed precisely on the weld seam within +/−0.001" to achieve a reasonably uniform weld bead. This is an order of magnitude difference in the precision needed to weld successfully. When a new setup is performed, the need for constant monitoring can be reduced by incorporating compensations such as beam shaking and 45° beam alignment for weld seam/laser beam alignment, for example, as shown in FIG. 2.

With the greater coverage offered by the beam shaking, much more laser power is transferred to the weld through reflection from the face of the weld clamp. This results in greater weld penetration (FIG. 7B) than for the conventional welding methods (FIG. 7A) The subject ID clamp design can allow for easy changing from one bellows size to another without a complicated setup or alignment procedure. In a specific embodiment, there are two parts to change; one upper and one lower clamp half that are manually pressed into a rotating bearing. They are then locked in place. These bearings are used as the reference surfaces for laser alignment and clamp alignment, and are very repeatable between the various clamp sizes. Clamp change time is approximately 10–15 minutes. The subject clamp design is unique, and carries with it some additional benefits. The clamp inserts (FIG. 4, 43–44) can be pressed into circular steel plates before final machining is done. This can assure that the clamp halves are running true and parallel with the reference surfaces. This can further assures us that the clamp will be made to perform as designed, and will comply with the predefined reference levels. Being inserts, the clamp faces can be re-machined and replaced as necessary, without incurring major expense. Replacing the inserts is a much cheaper and quicker alternative to replacing the whole clamp.

In a specific embodiment, the machined profile (FIG. 4, 43–44) placed on the inserts can exactly match the profile of the bellows diaphragms. By doing this, the clamps do not have to be made to exacting tolerances, but can be kept fairly loose (+/−0.002"). The ripple profile cut into the clamp faces in this manner, has the effect of self-aligning any minor displacement of the diaphragms in the clamp. Thus, this also relieves the tolerances on the pick-and-place mechanism, reducing manufacturing costs. In addition, there are no steps or notches to trap or hold contamination, or become damaged due to mishandling. They are also much easier to keep clean and polished.

The subject clamp design can afford very effective heat-sinking, and improves the stability and longevity of the clamping mechanism. This improves the weld quality by removing excess beat more effectively, and reduces the likelihood of burning on the steel diaphragms.

As mentioned briefly above, the subject bellows diaphragms can be stored in sealed containers prior to being loaded into the ID welding machine. These containers can have a number of features that contribute to the productivity and quality of the finished items. The containers (93), in a specific embodiment, can be made from clear Plexiglas or other transparent material. Other materials may be used, but this material allows an operator to see the bellows diaphragms inside, and estimate the number of pieces remaining. It also allows an operator to identify the contents. The containers can be loaded with male diaphragms in one container, female in another, and fixed to the bottom of the ID welding station via spring clips (102). The clips can hold the container securely in place against an airtight seal under the worktable in order to maintain cleanliness. A third container can be attached to the bottom of the worktable to catch welded convolutions after retrieval by the pick-and-place mechanism. Upon connecting to the system, an internal motor-driven screw (94) can turn and raises a platform (95) on which the diaphragms (91) are stacked. This puts the topmost diaphragms at the proper level for the pick-and-place mechanism to retrieve via a vacuum-operated cup. As the diaphragms are removed, sensors within the container sense a change in the level of the topmost diaphragms, and trigger the motor-driven screw to turn in order to maintain the correct height for the pick-and-place suction cup. This process can continue until the final diaphragm is lifted from the container, whereupon another sensor can signal the computer control that the container is empty, prompting the operator to replace the container with a fresh unit. At this point the machine can be signaled to pause operation, waiting for the operator to press a 'resume' key on the computer keyboard. One container can hold enough bellows diaphragms for approximately four continuous hours running (1200–1500 convolutions). Upon retrieving the welded convolutions from the weld area, the pick-and-place arm can release the newly welded item into an empty third container. This container can hold welded convolutions only. When the computer count reaches a predetermined figure the system can alert the operator that the container requires changing. This container can then be removed, and sealed before being released to the OD welding system. In this manner, an accurate check on inventory may be kept (the computer keeping track of all welded convolutions), and all product is kept in a state of absolute cleanliness. Throughout the ID welding process, the operator need not be required to handle any diaphragms directly, rather only through closed containers.

The subject OD welding apparatus can incorporate a laser beam being shaken as described above with respect to the ID welding apparatus embodiment. This oscillating, or shaking, can offers the same advantages previously mentioned in the ID welding section. With weld seam coverage in the manner described, the need for expensive and elaborate optical, mechanical or other seam tracking mechanisms can be reduced or eliminated.

In the subject design, the laser beam can be presented to the weld seam in a vertical plane with respect to the bellows centerline. This affords the operator the greatest safety from exposure to the beam, consistent with ease of operation, ease of changing bellows sizes, and maintenance. In a specific embodiment, if the operator were to accidentally start a weld sequence with no parts to weld, the laser beam would be harmlessly absorbed in the heavy aluminum base plate.

Our subject OD welding apparatus can incorporate a CCTV camera (50) which can use the same optical components to view the weld seam as the laser. Thus, to focus the laser onto the weld seam is easy, and can be performed by simply lowering the weld nozzle until the image on the CCTV monitor is clear and sharp. A crosshair on the monitor can indicate the position of the laser beam with respect to the seam, and thus positioning also is easy. A red sighting laser can also be included for further assistance in laser beam positioning.

The subject device can use a standard, off-the-shelf product to cause the laser beam to oscillate in the manner described. These devices can carry a small mirror attached to the free end of a fixed shaft that is made to twist at a certain (resonant) frequency. It can be varied in twist amplitude, in order to sweep a greater or lesser path. In a specific embodiment of the subject invention, two of these devices can be in the ID welding system (38,38'), and one device can be used in the OD welding system (38).

The weld shielding gas can be delivered coaxially through the laser beam delivery nozzle (39), which is placed in close proximity to the weld point on the seam. The gas can thus be emitted as a laminar flow moving in the same direction as the laser beam relative to the weld seam. At the weld site, the gas can issue out sideways, covering the weld area in a blanket of shield gas. This can allow reduction of the gas flow significantly while maintaining good weld performance. This contributes to lower manufacturing costs, and does not subject the operator to the effects of oxygen starvation due to heavy concentrations of shield gas in the ambient air. The subject systems can also have an air driven low-flow vacuum system installed to remove the spent shield gas, and discharge it to the outside of the building.

The subject method of weld parameter storage and control can allow easy access to many of the operating features associated with bellows welding. Weld parameters can be entered from written information kept in a logbook. When setting up the subject machines with as many adjustments and variables as they have, it would be difficult to repeat exactly a welding sequence that was done some time in the past. This is because adjustments may have been made to the clamp, clamp pressure, the laser, and optical components. Also the diaphragms may be from a different heat batch of material, and other subtle differences that affect weld performance. The subject logbook approach gets the operating parameters into the ballpark, so to speak. It is just a matter of a few moments then before the welding parameters are "tweaked", or fine tuned, to get good repeatable results. Then the machine is ready for production.

The weld ring design used in conventional welding methods (see Chang U.S. Pat. No. 6,262,387) has limitations. With this style weld ring, there can be insufficient melting of the diaphragm material, leaving shallow penetration and consequently, weak welds. The subject design has been used with much greater success, reliability, and repeatability. Although it pertains only to the OD welding machine, information about these rings is included, as was done by Chang in U.S. Pat. Nos. 6,078,021 and 6,262,387. In a specific design, the subject ring does not incorporate a step, or notch as Chang puts it (U.S. Pat. No. 6,262,387), in the outer edge of the ring. Instead, it has 45° beveled edges (FIG. 5) which can offer several advantages over the step or notch design. The beveled edge on the rings in this design can be machined with a highly polished finish. The bevel makes it easier and faster to make the ring, reducing manufacturing costs. The bevel is easier to keep clean than the step or notch, and is also less likely to pick up and hold contaminants. The bevel reflects laser light back onto the weld seam from the side, thereby allowing more of the available laser energy to perform the weld. In addition, because there is less absorption in this design due to the polished surface, the rings stay cleaner for longer periods, and result in less alloying at the weld root than in the stepped design. A specific embodiment of the subject ring can be split into two equal-sized parts, is reusable, designed for easy removal, and to be reusable up to at least thirty times before being discarded, further reducing manufacturing costs. The beveled edge allows greater control over the weld bead thickness. This is important for bellows cycle life (extension/compression cycles before failure). The rings can be inserted after the ID weld is complete. In this way, a stock of ID welded convolutions may be kept in inventory, ready to manufacture bellows when required. Since the rings are reusable, it is not necessary to manufacture as many rings.

Bellows diaphragms can be loaded into airtight containers and attached to the underside of the welding table (ID system). Seals can be activated prior to fitting these containers, and then released when the containers is connected to the operating system via a short control cable. This method can lower the loss of gas from within the welding chamber. Gas pressure within the chamber can be monitored by the controlling computer, and deliver fresh shield gas through a control port as required (ID system). Thus a controlled amount of gas is used, with minimal escape into the ambient air. Bellows diaphragms can be transported from the containers to the weld area by a pick-and-place arm, using vacuum cups (ID system). This vacuum system can have a higher discharge rate to allow for larger diaphragms. This system naturally pulls shield gas from the weld chamber, but a very small amount. The cups press down on the diaphragms before the vacuum is turned on through computer controlled solenoid valves.

A specific weld ring design can allow reuse (OD system). In former designs, the weld ring had a single thin sawcut through the ring. This allows a pick to be inserted into the cut for removing the rings from the welded bellows sections. This method results in ring distortion, and discarding of the ring. This also means that one ring must be made for every bellows convolution. The subject design shown in FIG. 9 incorporates two sawcuts to produce two half rings of equal size. This allows very easy removal without using a pick or distorting the ring. In this manner, the rings can be reassembled onto new convolutions, and reused to make new bellows sections. This design allows at least thirty to fifty reuses before the ring becomes damaged beyond use. This means that a set of rings could produce up to fifty sets of convolutions (often more), a considerable cost savings in machine time, weld ring material, and scrap metal recycling or disposal.

Item numbers and descriptions used in this patent application
19 Laser power supply
20 Laser beam generator (Laser head)
21 Upper laser beam
21a Displaced laser beam
22 Lower laser beam
23 50%–50% Beam splitter
24 Beam bending prism
25 Upper linear slide table
26 Lower linear slide table
27
28
29
30
31 Stepper motor
32 Pick and place arm
33 Vacuum cup
34 DC motor
35 Hand crank for manual seam tracking and positioning
36 Pick and place air cylinder
37
38 Scanner mirror
38a Displaced scanner mirror
39 Weld gas nozzle
40 Focusing lens
41 Male diaphragm
42 Female diaphragm
43 Upper clamp ring
44 Lower clamp ring
45
46 Focusing lens
47
48
49 CCTV monitor
50 B&W CCTV camera
51
52
53
54 Threaded shaft loaded with bellows diaphragms
55
56 DC motor for lathe
57
58 Solenoid valve
59 Controller for DC motor
60
61
62
63
64
65
66 Host computer
67
68
69
70
71 Focused spot from static laser beam
71a Focused spot from displaced laser beam
72 Focal plane
91 Bellows diaphragm stack
92 Container top
93 Container side
94 Diaphragm stack height adjusting screw
95 Diaphragm moving platform
96 Height adjustment nut
97 Reduction gear
98 Motor mounting platform
99 Lower seal plate
100
101 Worktable lower surface
102 Spring retainer clip
103 Retainer bracket
104 Diaphragm platform spacer block
105 DC motor
106 Lower mounting platform
107 Guidebearing
108 Upper screw bearing
109 Lower screw bearing It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method of welding, comprising:
applying a laser beam onto a seam of a first element and a second element, where the laser beam is of sufficient energy to melt a portion of the material of the first and second element onto which it is applied, oscillating the laser beam such that a laser spot of the laser beam scans back and forth across the seam, wherein oscillating the laser beam creates an effective laser spot size larger than the laser spot size, moving the oscillating laser beam along the seam, wherein the first element and second element are welded as the oscillating laser beam moves along the seam.

2. The method of claim 1, wherein a portion of the laser spot misses the seam, further comprising redirecting the portion of the laser spot onto the seam.

3. The method of claim 1, wherein said effective laser spot size ranges from two to four times the size of said seam.

4. The method of claim 1, wherein said laser beam is produced by a laser selected from the group consisting of Nd.YAG, Nd:Glass, Nd:YVO, CO, CO2, Cr:Ruby, diode laser, diode pumped laser, and derivatives thereof.

5. The method of claim 1, further comprising performing the welding in an inert atmosphere.

6. The method of claim 5, wherein said inert atmosphere is argon.

7. A method of edge welding, comprising:
A applying a laser beam onto a seam of a first element and a second element,
  i) where said laser beam comprises
    a. a diameter and
    b. sufficient energy to melt a portion of said first and said second element onto which it is applied, and
B. oscillating said laser beam such that a laser spot of said laser beam scans back and forth across said seam,
wherein oscillating said laser beam creates an effective laser spot size larger than said diameter of said laser beam; and
C. moving said oscillating laser beam along said seam,
wherein said first element and said second element are welded as said oscillating laser beam moves along said seam.

8. The method of claim 7, wherein a portion of the laser spot misses the seam, further comprising redirecting the portion of the laser spot onto the seam.

9. The method of claim 7 wherein said effective laser spot size ranges from two to four times the size of said seam.

10. The method of claim 7 wherein said laser beam is produced by a laser selected from the group consisting of Nd:YAG, Nd:Glass, Nd:YVO, Co, CO2, Cr:Ruby, diode laser, diode pumped laser, and derivatives thereof.

11. The method of claim 7, further comprising performing the welding in an inert atmosphere.

12. The method of claim 11, wherein said inert atmosphere is argon.

13. A method of edge welding, comprising:
A. welding a seam of a first element and a second element comprising:
  i) directing a laser beam onto a beam splitter, whereby two laser beams are created;
  ii) redirecting both of said two beams through a focusing lens, whereby said two laser beams are focused onto said seam of said first element and said second element;
    a) where said two laser beams comprise
      i. a diameter and
      ii. sufficient energy to melt a portion of said first and said second element onto which it is applied, and
    b) oscillating said two laser beams such that a laser spot of said two laser beams scans back and forth across said seam,
  wherein oscillating said two laser beam creates an effective laser spot size larger than said diameter of said two laser beams; and
    c) moving said oscillating two laser beams along said seam, wherein said first element and said second element are welded as said oscillating two laser beams move along said seam.

14. The method of claim 13, wherein a portion of the laser spot misses the seam, further comprising redirecting the portion of the laser spot onto the seam.

15. The method of claim 13, wherein said effective laser spot size ranges from two to four times the size of said seam.

16. The method of claim 13, wherein said laser beam is produced by a laser selected from the group consulting of Nd:YAG, Nd:Glss, Nd:YVO, CO, CO2, Cr:Ruby, diode laser, diode pumped laser, and derivatives thereof.

17. The method of claim 13, further comprising performing the welding in an inert atmosphere.

18. The method of claim 17, wherein said inert atmosphere is argon.

* * * * *